US011918545B2

(12) United States Patent
Newsom

(10) Patent No.: US 11,918,545 B2
(45) Date of Patent: Mar. 5, 2024

(54) PILL CUTTER AND PILL CUTTING ASSEMBLY

(71) Applicant: Jeffrey Newsom, Farmington, MI (US)

(72) Inventor: Jeffrey Newsom, Farmington, MI (US)

( * ) Notice: Subject to any disclaimer, the term of this patent is extended or adjusted under 35 U.S.C. 154(b) by 241 days.

(21) Appl. No.: 17/377,661

(22) Filed: Jul. 16, 2021

(65) Prior Publication Data

US 2022/0015990 A1 Jan. 20, 2022

Related U.S. Application Data

(60) Provisional application No. 63/053,046, filed on Jul. 17, 2020.

(51) Int. Cl.
*A61J 7/00* (2006.01)
*A61J 1/03* (2023.01)

(52) U.S. Cl.
CPC ............... *A61J 7/0007* (2013.01); *A61J 1/03* (2013.01)

(58) Field of Classification Search
CPC ...... A61J 7/0007; A61J 7/0069; A61J 7/0092; A61J 1/03; Y10T 225/371; B26F 3/00
USPC ........................................................ 30/124
See application file for complete search history.

(56) References Cited

U.S. PATENT DOCUMENTS

| | | | | |
|---|---|---|---|---|
| 4,422,553 A | | 12/1983 | Hoeks et al. | |
| D294,467 S | | 3/1988 | Wirkus | |
| 4,887,755 A | * | 12/1989 | Gibilisco | A61J 7/0007 241/168 |
| 5,118,021 A | * | 6/1992 | Fiocchi | A61J 7/0007 241/DIG. 27 |
| 5,322,227 A | | 6/1994 | Fiocchi | |
| 6,089,180 A | | 7/2000 | Nichols | |
| 7,458,300 B2 | | 12/2008 | Williams | |
| 9,849,068 B2 | | 12/2017 | Martin | |
| 10,457,472 B2 | | 10/2019 | Sanders | |
| 2017/0273868 A1 | * | 9/2017 | Wang | B26D 5/10 |

* cited by examiner

*Primary Examiner* — Phong H Nguyen
(74) *Attorney, Agent, or Firm* — University of Detroit Mercy School of Law International IP Clinic

(57) ABSTRACT

A pill cutter attachable to a pill bottle for splitting a pill to form a split pill that includes a pill cutter body extending between first and second body ends. The first body end presents a first surface for holding a pill. A lid is coupled to the first body end, is moveable between open and closed positions, and presents a second surface facing the first surface when in the closed position. A cutting instrument is coupled to the second surface of the lid and is configured to split the pill to form a split pill when the lid is moved from the open position toward the closed position. A cutter connector extends away from the second body end of the pill cutter body. The cutter connector is configured to attach rotatably to a pill bottle to collectively define a holding chamber for holding the split pill.

20 Claims, 4 Drawing Sheets

PILL CUTTER AND PILL CUTTING ASSEMBLY

The present disclosure is a non-provisional application claiming priority to U.S. Provisional Application No. 63/053,046, filed Jul. 17, 2021, he contents of which are incorporated by reference herein, it its entirety.

BACKGROUND

The present invention relates generally to containers for pill medicines or supplements, and more specifically to integrated pill cutters for splitting a pill to form a split pill.

Pill cutters are used to split a pill to form a split pill. Typical pill cutters include a pill cutter body and a lid coupled to the pill cutter body. Commonly, a cutting instrument is coupled to the lid. The cutting instruments known in the art are configured to split the pill to form the split pill.

Commonly, a user is prescribed, or otherwise uses, a dosage of a medication or nutritional supplement. The user may purchase a pill containing a higher dosage of the medication or supplement than was prescribed to, or otherwise used by, the user. Typically, purchasing the pill containing a higher dosage of medication or supplement is desirable because of the lower cost per dosage of the medication or supplement associated with purchasing the pill containing the higher dosage of medication. Moreover, purchasing the pill containing the higher dosage of medication or supplement is commonly desirable if the dosage prescribed to, or otherwise used by, the user is not commercially available in a single pill. Also, in some cases a split pill may enable a more exact dosage than is available using whole commercially available pills. Thus, it is desirable for a user to split the pill to form a split pill to decrease the dosage of the medication or supplement.

Typically, during operation of typical pill cutters, the pill cutters are placed upon a flat surface or hand-held by the user to prevent the pill from sliding out of reach of the cutting instrument. After the pill has been split to form the split pill, the user typically ingests, or otherwise uses, a portion of the split pill. However, other unused portion(s) of the split pill are commonly left over. These unused portion (s) of the split pill may be misplaced by the user. Alternatively, the unused portion(s) of the split pill may be left near the cutting instrument, preventing the pill cutter from being used to split pills containing other medications or supplements. Moreover, many unused portion(s) from multiple medications and/or supplements may be intermingled in storage, thus potentially preventing the user from administering the correct medication or supplement.

As such, there remains a need to provide an improved pill cutter.

SUMMARY

The present application discloses a pill cutter attachable to a pill bottle for splitting a pill to form a split pill. The pill cutter includes a pill cutter body extending along an axis between a first body end and a second body end spaced from the first body end along the axis. The first body end of the pill cutter body presents a first surface for holding a pill. A lid is coupled to the first body end of the pill cutter body. The lid is moveable between an open position and a closed position. The lid presents a second surface facing the first surface when in the closed position.

A cutting instrument is coupled to the second surface of the lid, and the cutting instrument is configured to split the pill to form a split pill when the lid is moved from the open position toward the closed position. A cutter connector extends away from the second body end of the pill cutter body. The cutter connector is configured to attach rotatably to a pill bottle to collectively define a holding chamber for holding the split pill.

A user of the pill cutter of the present invention may split the pill to form the split pill. The user then ingests, or otherwise uses, a portion of the split pill. The user then may deposit other unused portion(s) of the split pill in the holding chamber collectively defined by the cutter connector and the pill bottle. In this way, the user is prevented from misplacing the unused portion(s) of the split pill. Furthermore, the cutting instrument remains free of unused portion(s) of the split pill, thus allowing the pill cutter to be used to split pills containing other medications or supplements. Moreover, the pill cutter prevents unused portion(s) from multiple medications or supplements from being intermingled in storage, thus assisting the user in administering the correct medication or supplement.

Moreover, the pill bottle may be commercially available from a pharmacy. Said differently, the pill bottle may include a label identifying the medication and/or supplement in the pill bottle, and may include dosage instructions on how to take, when to take, and/or how much to take of the medication and/or supplement. The cutter connector is able to be attached to the pill bottle that is commercially available from the pharmacy.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1A:
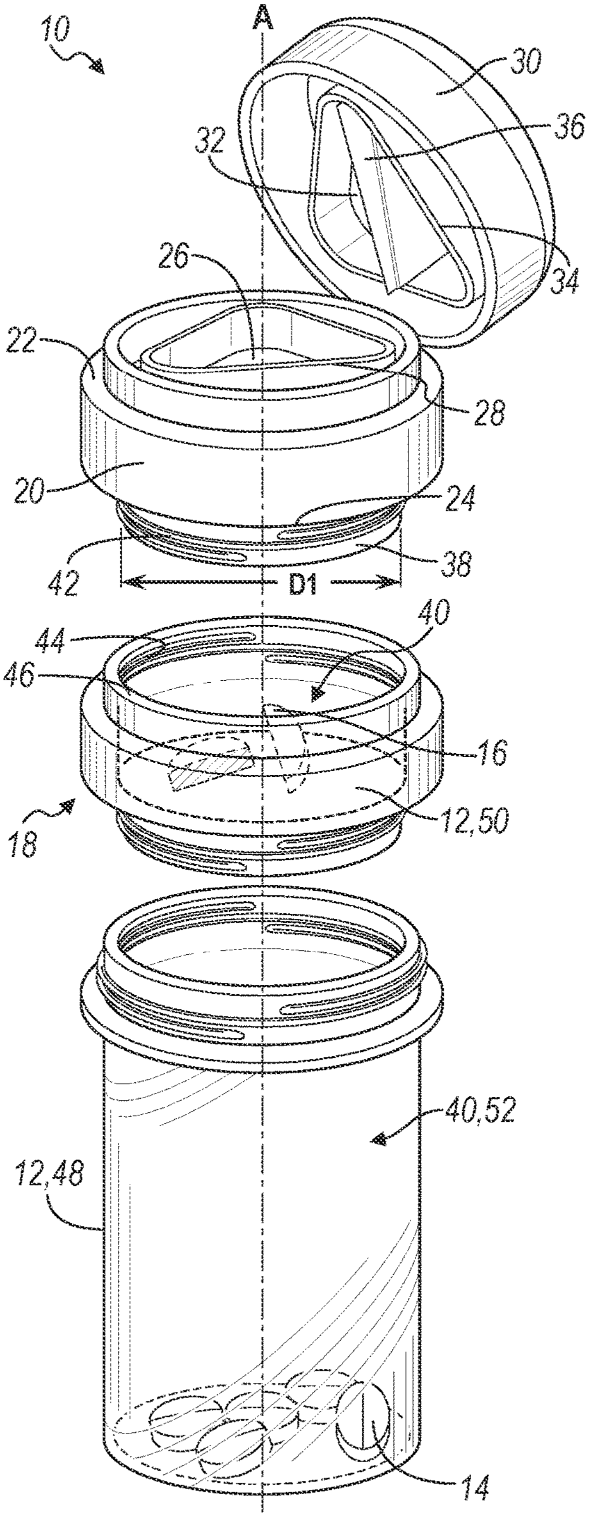
FIG. 1A is an exploded view of a pill cutting assembly including a pill bottle including a pill bottle body and a pill bottle cap including a bottle connector as a female threaded connector and a pill cutter having a cutter connector as a male threaded connector.

Disclosed herein are pill cutters and pill bottles comprising pill cutters. It will be understood that any features described herein may be used in combination with one or more of any other disclosed features. Moreover, the specific embodiments disclosed herein are merely preferred embodiments of the present disclosure. No features are essential or indispensable.

The following description and examples illustrate a preferred embodiment of the present invention in detail. Those of skill in the art will recognize that there are numerous variations and modifications of this invention that are encompassed by its scope. Accordingly, the description of a preferred embodiment should not be deemed to limit the scope of the present invention.

With reference to the Figures, wherein like numerals indicate like parts throughout the several views, a pill cutter 10 is shown in perspective view in FIGS. 1B, 2B, 3B, and 4B. The pill cutter 10 is attachable to a pill bottle 12 for splitting a pill 14 to form a split pill 16. A pill cutting assembly 18 is also provided. The pill cutting assembly 18 includes the pill cutter 10 and the pill bottle 12.

The pill cutter 10 includes a pill cutter body 20 extending along an axis A between a first body end 22 and a second body end 24 spaced from the first body end 22 along the axis A. It is to be appreciated that the first and second body ends 22, 24 need not be the exact terminuses of the pill cutter body 20. The first body end 22 of the pill cutter body 20 presents a first surface 26 for holding the pill 14. The first surface 26 may be generally flat to allow the pill to lay flat, and the first surface 26 may include a first raised portion 28. The first raised portion 28 extends away from the first surface 26, and may be of a variety of shapes including, but not limited to, circular, oval, square, rhombus, and any other polygonal or curved shape.

Figure 1B:
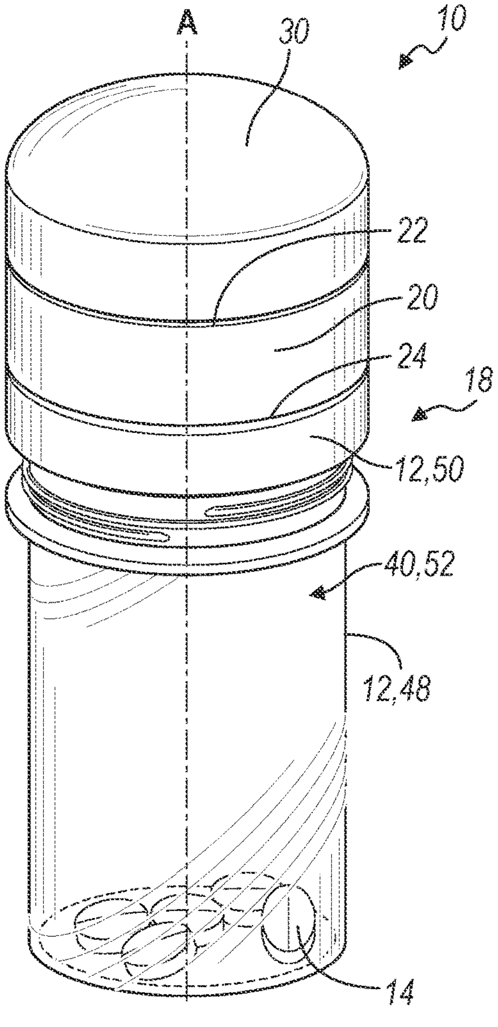
FIG. 1B is a perspective view of the pill cutting assembly of FIG. 1A.

A lid 30 is coupled to the first body end 22 of the pill cutter body 20. The lid 30 is moveable between an open position and a closed position, as shown in FIGS. 1A and 1B. The lid 30 may be moveable between the open and closed positions through a hinge mechanism. Alternatively, it is to be appreciated that the lid 30 may be moveable between the open and closed positions through a variety of mechanisms which require a user to manually move. The lid 30 presents a second surface 32 facing the first surface 26 when in the closed position. The second surface 32 of the lid 30 may include a second raised portion 34 that extends away from the second surface 32. The second raised portion 34 may be of a variety of shapes including, but not limited to, circular, oval, square, rhombus, and any other polygonal or curved shape. It is to be appreciated that the shape of the second raised portion 34 may be complementary to the shape of the first raised portion 28. The first and second raised portions 28, 34 together may define a confined space in the closed position.

A cutting instrument 36 is coupled to the second surface 32 of the lid 30, and the cutting instrument 36 is configured to split the pill 14 to form a split pill 16 when the lid 30 is moved from the open position toward the closed position. A cutter connector 38 extends away from the second body end 24 of the pill cutter body 20. The cutter connector 38 is configured to attach rotatably to a pill bottle 12 to collectively define a holding chamber 40 for holding the split pill 16.

The user of the pill cutter 10 of the present invention may split the pill 14 to form the split pill 16. The user then ingests, or otherwise uses, a portion of the split pill 16. The user then may deposit other unused portion(s) of the split pill 16 in the holding chamber 40 collectively defined by the cutter connector 38 and the pill bottle 12. In this way, the user is prevented from misplacing the unused portion(s) of the split pill 16. Furthermore, the cutting instrument 36 remains free of unused portion(s) of the split pill 16, thus allowing the pill cutter 10 to be used to split pills containing other medications or supplements. Moreover, the pill cutter 10 prevents unused portion(s) from multiple medications and/or supplements from being intermingled in storage, thus assisting the user in administering the correct medication and/or supplement.

Moreover, the pill bottle 12 may be commercially available from a pharmacy. Said differently, the pill bottle 12 may include a label identifying the medication and/or supplement in the pill bottle 12, and may include dosage instructions on how to take, when to take, and/or how much to take of the medication and/or supplement. The cutter connector 38 is able to be attached to the pill bottle 12 that is commercially available from a pharmacy. Moreover, the pill cutter 10 may attach to the pill bottle 12 without any additional accessory components.

The cutter connector 38 may be chosen from one of a male threaded connector 42 and a female threaded connector 44. In other words, the cutter connector 38 may either be the male threaded connector 42 or may be the female threaded connector 44. It is to be appreciated that the cutter connector 38, whether as the male threaded connector 42 or the female threaded connector 44, is able to be attached to the pill bottle 12 that is commercially available from the pharmacy.

The pill bottle 12 may include a bottle connector 46 chosen from the other one of a male threaded connector 42 and a female threaded connector 44. In other words, the bottle connector 46 may be either the male threaded connector 42 or the female threaded connector 44. Whether the bottle connector 46 is the male threaded connector 42 or the female threaded connector 44 may be dependent upon if the cutter connector 38 is the male threaded connector 42 or the female threaded connector 44. Said differently, if the cutter connector 38 is the male threaded connector 42, then the bottle connector 46 may be the female threaded connector 44. Alternatively, if the cutter connector 38 is the female threaded connector 44, then the bottle connector 46 may be the male threaded connector 42.

The cutter connector 38 may be configured to be engageable with the bottle connector 46 of the pill bottle 12 to attach the pill cutter 10 to the pill bottle 12. In a non-limiting example, the cutter connector 38 may be the male cutter connector 42, the bottle connector 46 may be the female threaded connector 44, and the male threaded connector 42 of the pill cutter 10 may be configured to screw into the female threaded connector 44 of the pill bottle 12 to engage the pill cutter 10 with the pill bottle 12. Alternatively, in another non-limiting example, the cutter connector 38 may be the female cutter connector 44, the bottle connector 46 may be the male threaded connector 42, and the male threaded connector 42 of the pill bottle 12 may be configured to screw into the female threaded connector 44 of the pill cutter 10 to engage the pill cutter 10 with the pill bottle 12.

In one embodiment, as shown in FIGS. 1A-2B, the bottle connector 46 of the pill bottle 12 is the female threaded connector 44, the cutter connector 38 is the male threaded connector 42, and the male threaded connector 42 of the pill cutter 10 is configured to be engageable with the female threaded connector 44 of the pill bottle 12 to collectively define the holding chamber 40 for holding the split pill 16.

The pill bottle 12 may have a pill bottle body 48 and a pill bottle cap 50. The pill bottle body 48 may define a bottle interior 52. Additionally, the pill bottle cap 50 may be invertible relative to the pill bottle body 48. The pill bottle cap 50 may include both a female threaded connector 44 and a male threaded connector 42. Similarly, the pill bottle body 48 may include both a female threaded connector 44 and a male threaded connector 42. When the pill bottle 12 is commercially available and sold at the pharmacy, the male threaded connector 42 of the pill bottle body 48 is engaged with (e.g. screwed into) the female threaded connector 44 of the pill bottle cap 50.

Typically, this engagement between the male threaded connector 42 of the pill bottle body 48 and the female threaded connector 44 of the pill bottle cap 50 is child-proof such that additional force beyond rotational force is necessary to disengage the pill bottle cap 50 from the pill bottle body 48. However, the pill bottle cap 50 may be inverted such that the male threaded connector 42 of the pill bottle cap 50 is engaged with (e.g. screwed into) the female threaded connector 44 of the pill bottle body 48. Upon inverting the pill bottle cap 50, the engagement between the male threaded connector 42 of the pill bottle cap 50 and the female threaded connector 44 of the pill bottle body 48 is not child-proof such that no additional force beyond rotational force is necessary to disengage the pill bottle cap 50 from the pill bottle body 48.

In one embodiment, as shown in FIGS. 1A and 1B, the pill bottle cap 50 of the pill bottle 12 includes the female threaded connector 44, and the male threaded connector 42 of the pill cutter 10 is configured to be engageable with the female threaded connector 44 of the pill bottle cap 50 to collectively define the holding chamber 40 for holding the split pill 16. The pill bottle cap 50, therefore, may include the bottle connector 46. In this embodiment, the pill bottle 12 may be commercially available and the engagement between the male threaded connector 42 of the pill bottle cap 50 and the female threaded connector 44 of the pill bottle body 50 may not be child-proof such that no additional force beyond rotational force is necessary to disengage the pill bottle cap 50 from the pill bottle body 48. Alternatively, it is to be appreciated that the engagement between the male threaded connector 42 of the pill bottle cap 50 and the female threaded connector 44 of the pill bottle body 48 may be child-proof such that additional force beyond rotational force is necessary to disengage the pill bottle cap 50 from the pill bottle body 48.

The pill bottle cap 50 and the cutter connector 38 may collectively define the holding chamber 40 for holding the split pill, and the pill bottle cap 50 and the pill bottle body 48 may collectively define the bottle interior 52 separate from the holding chamber 40 for holding the pill.

Users, especially elderly users, are able to access the holding chamber 40 and the bottle interior 52 without being required to navigate any child-proof engagements. Moreover, the holding chamber 40 and the bottle interior 52 may be defined separately from one another such that pills may be stored in the bottle interior 52, and split pills may be stored in the holding chamber 40 without intermingling the pills and the split pills. Therefore, the pill cutter 10 provides easy access to the split pills without the user having to search through the pills that have yet to be split.

In the embodiment where the pill bottle cap 50 of the pill bottle 12 includes the female threaded connector 44, the male threaded connector 42 of the pill cutter 10 may have a first diameter D1 of about 25 to 50 millimeters, about 30 to 40 millimeters, or about 32 to 36 millimeters. It is to be appreciated that the first diameter D1 may larger than 50 millimeters, or may even be smaller than 25 millimeters. The first diameter D1 is specifically selected such that the cutter connector 38 (i.e., in this embodiment, the male threaded connector 42 of the pill cutter 10) is configured to attach to the pill bottle 12. More specifically, the first diameter D1 is selected such that the male threaded connector 42 of the pill cutter 10 is configured to attach to the inverted pill bottle cap 50 of the commercially available pill bottles 12. Because the dimensions of commercially available pill bottles 12 are typically universal, the pill cutter 10 is able to attach to many pill bottles 12 from a variety of manufacturers.

Figure 2A:
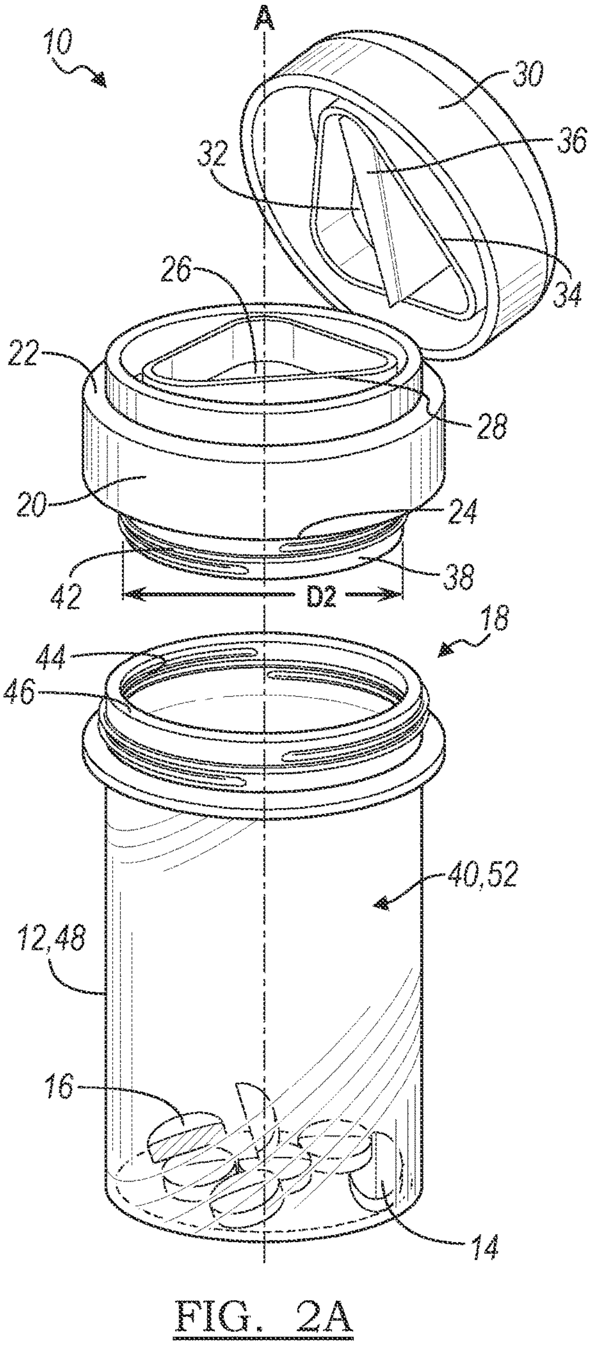
FIG. 2A is an exploded view of a pill cutting assembly including a pill bottle including the pill bottle body including the bottle connector as the female threaded connector, and the pill cutter having the cutter connector as the male threaded connector.
Figure 2B:
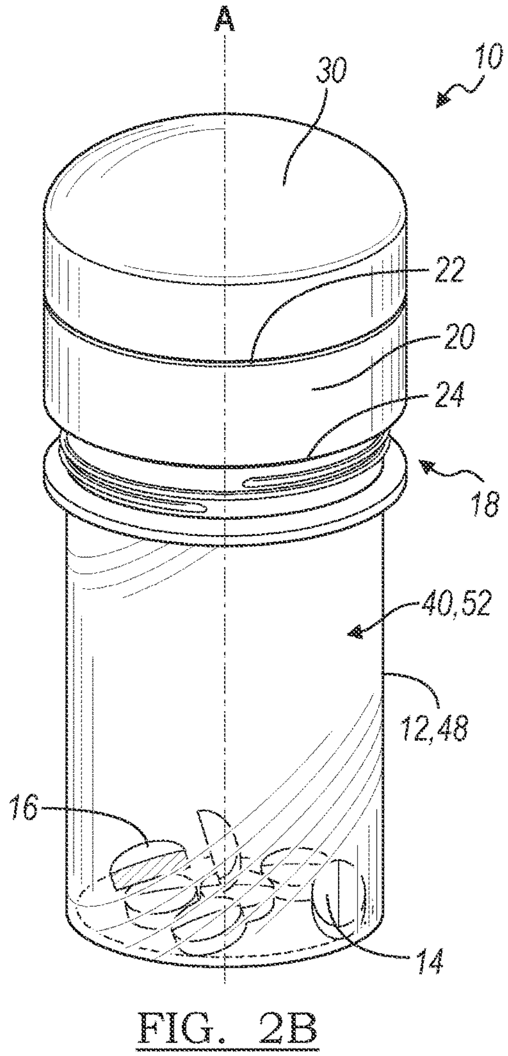
FIG. 2B is a perspective view of the pill cutting assembly of FIG. 2A.

In another embodiment, as shown in FIGS. 2A and 2B, the pill bottle body 48 of the pill bottle 12 includes the female threaded connector 44. In this embodiment, the male threaded connector 42 of the pill cutter 10 is configured to be engageable with the female threaded connector 44 of the pill bottle 12 to collectively define the holding chamber 40 for holding the split pill 16. The pill bottle body 48, therefore, may include the bottle connector 46. The engagement between the male threaded connector 42 of the pill cutter 10 and the female threaded connector 44 of the pill bottle body 48 may be not child-proof such that no additional force beyond rotational force is necessary to disengage the pill cutter 10 from the pill bottle body 48. Additionally, in this embodiment, the pill bottle 12 does not require the pill bottle cap 50 for the pill cutter 10 to split the pill to form the split pill.

In the embodiment where the pill bottle body 48 of the pill bottle 12 includes the female threaded connector 44, the male threaded connector 42 of the pill cutter 10 may have a second diameter D2 of about 20 to 40 millimeters, about 25 to 35 millimeters, or about 28 to 33 millimeters. It is to be appreciated that the second diameter D2 may larger than 40 millimeters, or may even be smaller than 20 millimeters. The second diameter D2 is specifically selected such that the cutter connector 38 (i.e., in this embodiment, the male threaded connector 42 of the pill cutter 10) is configured to attach to the pill bottle 12. More specifically, the second diameter D2 is selected such that the male threaded connector 42 of the pill cutter 10 is configured to attach to the female threaded connection 44 of the pill bottle body 48 of the commercially available pill bottles 12. Because the dimensions of commercially available pill bottles 12 are typically universal, the pill cutter 10 is able to attach to many pill bottles 12 from a variety of manufacturers. Additionally, in this embodiment, the pill bottle 12 does not require the pill bottle cap 50 for the pill cutter 10 to split the pill to form the split pill.

In yet another embodiment, the bottle connector 46 of the pill bottle 12 is the male threaded connector 42 and the cutter connector 38 is the female threaded connector 44. In this embodiment, the female threaded connector 44 of the pill cutter 10 is configured to be engageable with the male threaded connector 42 of the pill bottle 12 to collectively define the holding chamber 40 for holding the split pill 16.

Figure 3A:
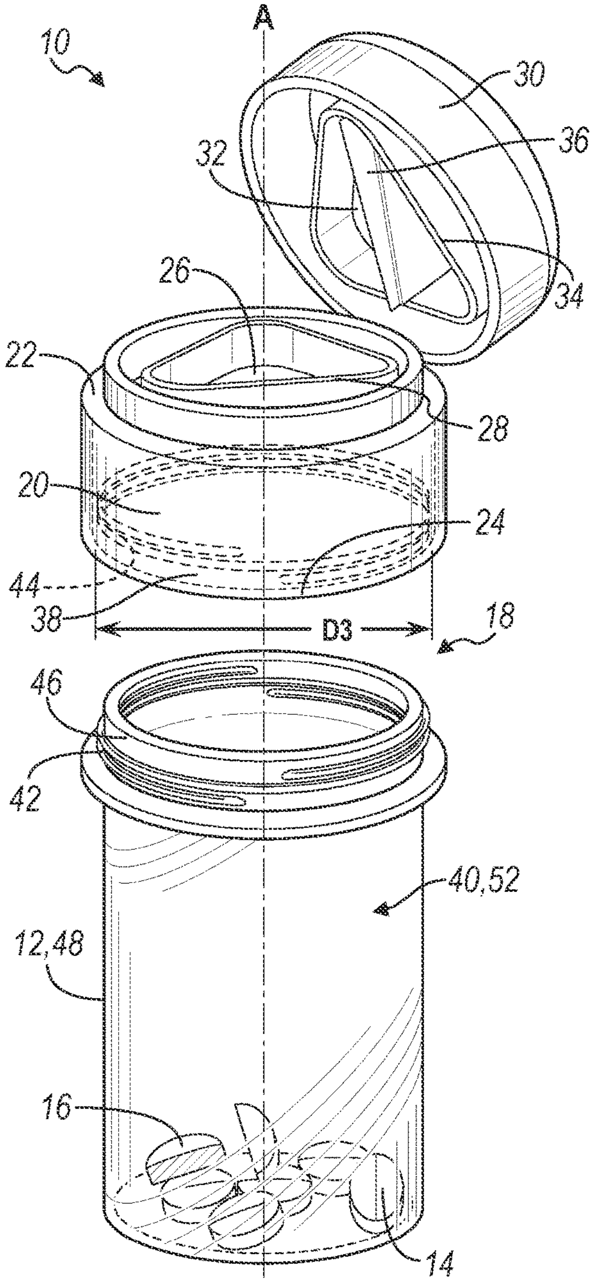
FIG. 3A is an exploded view of the pill cutting assembly including the pill bottle including the pill bottle body including the bottle connector as the male threaded connector, and the pill cutter having the cutter connector as the female threaded connector.
Figure 3B:
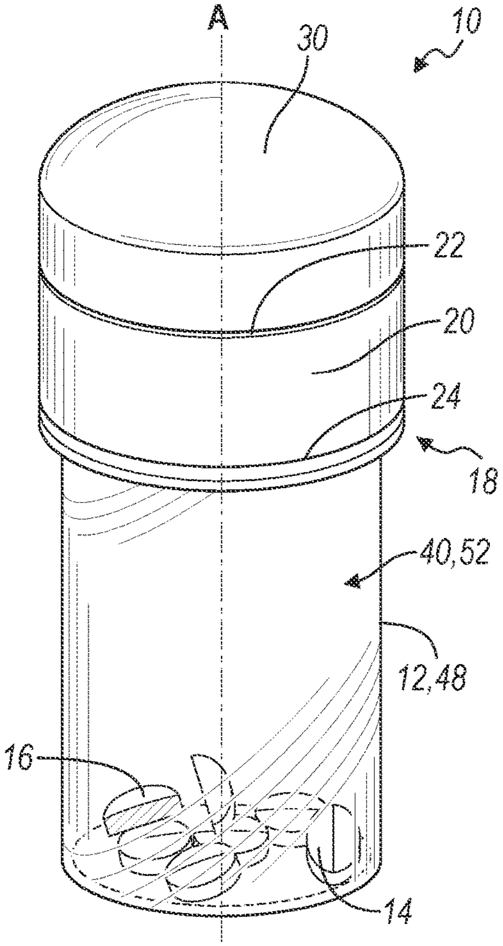
FIG. 3B is a perspective view of the pill cutting assembly of FIG. 3A.

In one embodiment, as shown in FIGS. 3A and 3B, the pill bottle body 48 of the pill bottle 12 includes the male threaded connector 42. In this embodiment, the female threaded connector 44 of the pill cutter 10 is configured to be engageable with the male threaded connector 42 of the pill bottle body 48 to collectively define the holding chamber 40 for holding the split pill 16. The pill bottle body 48, therefore, may include the bottle connector 46. The engagement between the female threaded connector 44 of the pill cutter 10 and the male threaded connector 42 of the pill bottle body 48 may be not child-proof such that no additional force beyond rotational force is necessary to disengage the pill cutter 10 from the pill bottle body 48. Additionally, in this embodiment, the pill bottle 12 does not require the pill bottle cap 50 for the pill cutter 10 to split the pill to form the split pill.

In the embodiment where the pill bottle body 48 of the pill bottle 12 includes the male threaded connector 42, the female threaded connector 44 of the pill cutter 10 may have a third diameter D3 of about 30 to 55 millimeters, about 35 to 50 millimeters, or about 38 to 45 millimeters. It is to be appreciated that the third diameter D3 may larger than 55 millimeters, or may even be smaller than 30 millimeters. The third diameter D3 is specifically selected such that the cutter connector 38 (i.e., in this embodiment, the female threaded connector 44 of the pill cutter 10) is configured to attach to the pill bottle 12. More specifically, the third diameter D3 is selected such that the female threaded connector 44 of the pill cutter 10 is configured to attach to the male threaded connector 42 of the pill bottle body 48 of the commercially available pill bottles 12. Because the dimensions of commercially available pill bottles 12 are typically universal, the pill cutter 10 is able to attach to many pill bottles 12 from a variety of manufacturers.

Figure 4A:
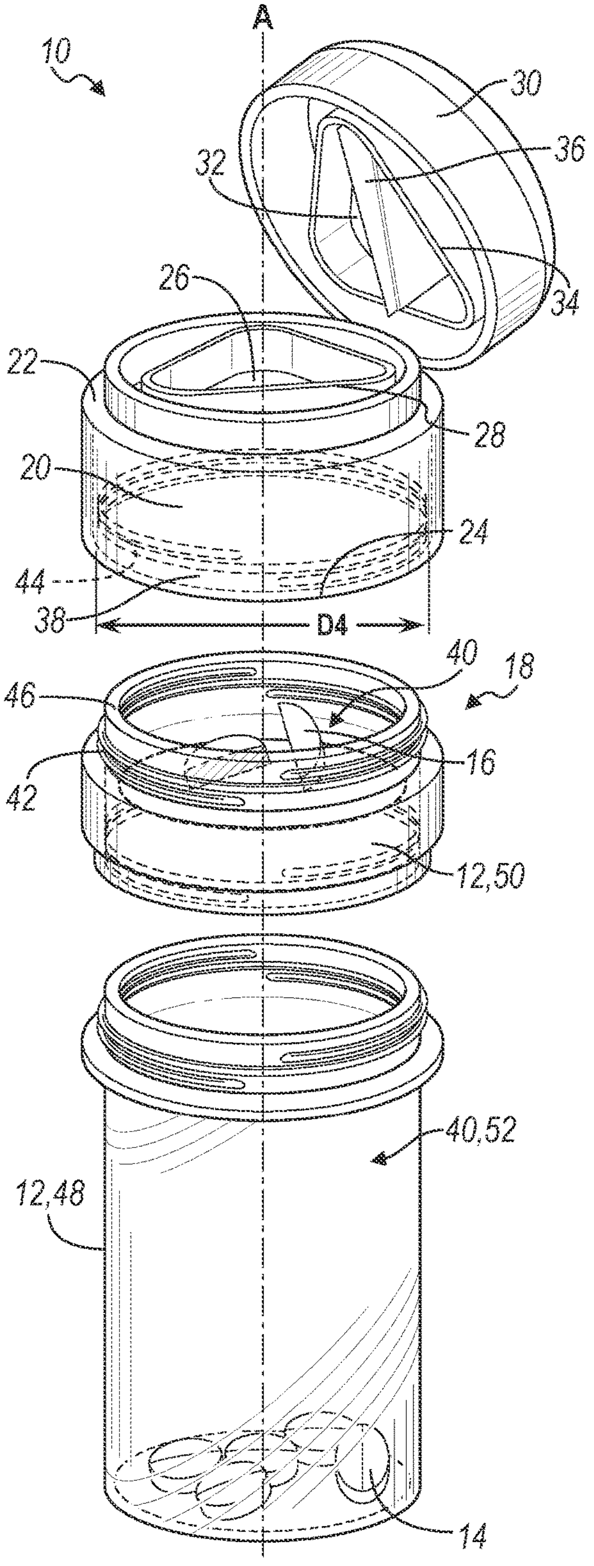
FIG. 4A is an exploded view of the pill cutting assembly including the pill bottle including the pill bottle body and the pill bottle cap including the bottle connector as the male threaded connector and the pill cutter having the cutter connector as the female threaded connector.
Figure 4B:
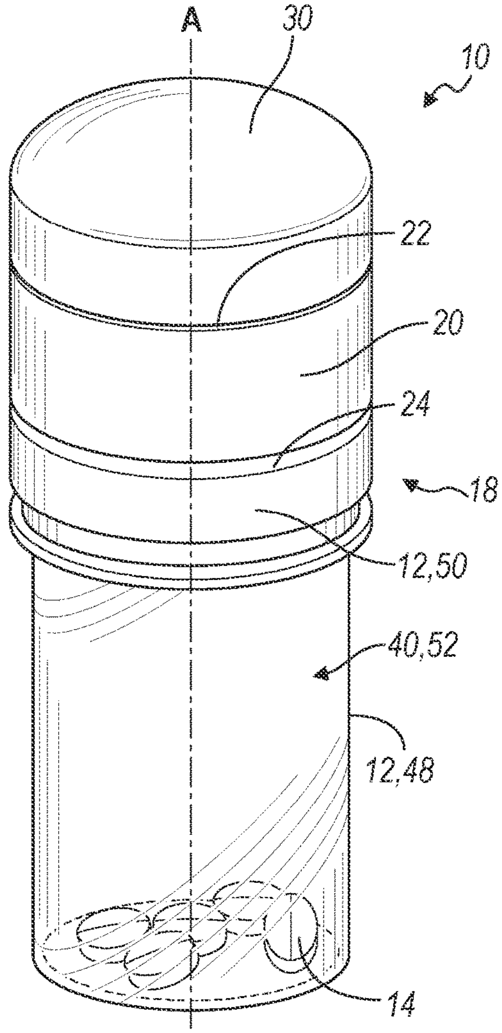
FIG. 4B is a perspective view of the pill cutting assembly of FIG. 4A.

In one embodiment, as shown in FIGS. 4A and 4B, the pill bottle cap 50 of the pill bottle 12 includes the male threaded connector 42. In this embodiment, the female threaded connector 44 of the pill cutter 10 is configured to be engageable with the male threaded connector 42 of the pill bottle cap 50 to collectively define the holding chamber 40 for holding the split pill 16. The pill bottle cap 50, therefore, may include the bottle connector 46. The engagement between the female threaded connector 44 of the pill cutter 10 and the male threaded connector 42 of the pill bottle cap 50 may be not child-proof such that no additional force beyond rotational force is necessary to disengage the pill cutter 10 from the pill bottle cap 50.

In the embodiment where the pill bottle cap 50 of the pill bottle 12 includes the male threaded connector 42, the female threaded connector 44 of the pill cutter 10 may have a fourth diameter D4 of about 20 to 50 millimeters, about 25 to 40 millimeters, or about 28 to 35 millimeters. It is to be appreciated that the fourth diameter D4 may larger than 50 millimeters, or may even be smaller than 20 millimeters. The fourth diameter D4 is specifically selected such that the cutter connector 38 (i.e., in this embodiment, the female threaded connector 44 of the pill cutter 10) is configured to attach to the pill bottle 12. More specifically, the fourth diameter D4 is selected such that the female threaded connector 44 of the pill cutter 10 is configured to attach to the male threaded connection 42 of the pill bottle cap 50 of the commercially available pill bottles 12. Because the dimensions of commercially available pill bottles 12 are typically universal, the pill cutter 10 is able to attach to many pill bottles 12 from a variety of manufacturers.

It is to be appreciated that the pill cutter body 20 and the cutter connector 38 may be formed as one-piece. It is also to be appreciated that the pill cutter body 20 and the cutter connector 38 may be integral and unitary with one another. Alternatively, the pill cutter body 20 and the cutter connector 38 may be formed separately and later coupled together. In non-limiting examples, the pill cutter body 20 and the cutter connector 38 may be injection molded, cast, or otherwise formed separately, and later joined through use of an adhesive, a welding process, a brazing process, a soldering process, a snap-fit arrangement, a press-fit arrangement, or any other mechanical coupling. It is also to be appreciated that the pill cutter 10 may be formed from a variety of materials, including, but not limited to, plastic or metal.

A method of using the pill cutter 10 is also provided. The method of using the pill cutter 10 includes the step of moving the lid 30 from the closed position to the open position. The method also includes the step of placing the pill 14 on the first surface 26 of the pill cutter body 20. The method further includes the step of moving the lid 30 from the open position toward the closed position such that the cutting instrument 36 contacts the pill 14 to split the pill 14 to form the split pill 16.

The method may also include the step of rotatably attaching the pill cutter 10 to the pill bottle 12. Although not required, the method may further include the step of threading the cutting connector 38 (e.g., one of the male threaded connector 42 and the female threaded connector 44) of the pill cutter body 20 with the bottle connector 46 (e.g., the other one of the male threaded connector 42 and the female threaded connector 44) of the pill bottle 12. It is to be appreciated that the step of threading the cutting connector 38 with the bottle connector 46 may be accomplished with either the pill bottle body 48 or the pill bottle cap 50 having the bottle connector 46.

Moreover, the method may include the step of placing the pill 14 on the first surface 26 and enclosed by the first raised portion 28. After the pill 14 is split to form the split pill 16, the first raised portion 28 prevents the split pill 16 from falling away from the pill cutter 10. Additionally, the method may include the step of depositing the split pill 16 in the holding chamber 40. In the embodiments where the holding chamber 40 is separate from the bottle interior 52, the step of depositing the split pill 16 in the holding chamber 40 separates the pills 14 from the split pills 16.

Although some embodiments of the invention have been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the scope thereof. Therefore, it is intended that the invention not be limited to the particular embodiments disclosed in the above detailed description, but that the invention will include all embodiments falling within the scope of the appended claims.

All numbers expressing quantities of ingredients, reaction conditions, and so forth used in the specification are to be understood as being modified in all instances by the term ‘about.’ Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

What is claimed is:

1. A pill cutter attachable to a pill bottle for splitting a pill to form a split pill, said pill cutter comprising:

- a pill cutter body extending along an axis between a first body end and a second body end spaced from said first body end along said axis, with said first body end of said pill cutter body presenting a first surface for holding the pill;
- a lid coupled to said first body end of said pill cutter body, with said lid moveable between an open position and a closed position, and with said lid presenting a second surface facing said first surface of the pill cutter body when in said closed position;
- a cutting instrument coupled to said second surface of said lid, with said cutting instrument configured to split the pill to form a split pill when said lid is moved from said open position toward said closed position;

a holding chamber member having a first end configured to be releasably coupled to the second body end of the pill cutter body, the holding chamber further having a second end configured to be releasably coupled to the pill bottle, the holding chamber member defining a storage chamber for the split pill;

a cutter connector extending away from said second body end of said pill cutter body, with said cutter connector configured to attach rotatably to either the pill bottle or to the holding chamber member.

2. The pill cutter as set forth in claim 1, wherein said cutter connector is chosen from one of a male threaded connector and a female threaded connector.

3. The pill cutter as set forth in claim 2, wherein the pill bottle includes a bottle connector chosen from the other one of a male threaded connector and a female threaded connector, and wherein said cutter connector is configured to be engageable with the bottle connector of the pill bottle to attach said pill cutter to the pill bottle.

4. The pill cutter as set forth in claim 3, wherein the bottle connector of the pill bottle is the female threaded connector, wherein said cutter connector is said male threaded connector, and wherein said male threaded connector of said pill cutter is configured to be engageable with the female threaded connector of the pill bottle to collectively define the holding chamber for holding the split pill.

5. The pill cutter as set forth in claim 4, wherein the pill bottle has a pill bottle body and a pill bottle cap, wherein the pill bottle cap of the pill bottle includes the female threaded connector, and wherein said male threaded connector of said pill cutter is configured to be engageable with the female threaded connector of the pill bottle cap to collectively define the holding chamber for holding the split pill.

6. The pill cutter as set forth in claim 5, wherein said male threaded connector of said pill cutter has a first diameter of about 25 to 50 millimeters.

7. The pill cutter as set forth in claim 4, wherein the pill bottle has a pill bottle body, wherein the pill bottle body of the pill bottle includes the female threaded connector, and wherein said male threaded connector of said pill cutter is configured to be engageable with the female threaded connector of the pill bottle to collectively define the holding chamber for holding the split pill.

8. The pill cutter as set forth in claim 7, wherein said male threaded connector of said pill cutter has a second diameter of about 20 to 40 millimeters.

9. The pill cutter as set forth in claim 3, wherein the bottle connector of the pill bottle is the male threaded connector, wherein said cutter connector is said female threaded connector, and wherein said female threaded connector of said pill cutter is configured to be engageable with the male threaded connector of the pill bottle to collectively define the holding chamber for holding the split pill.

10. The pill cutter as set forth in claim 9, wherein said female threaded connector of said pill cutter has a third diameter of about 30 to 55 millimeters.

11. The pill cutter as set forth in claim 1, wherein the pill cutter body and said cutter connector are formed as one-piece.

12. A pill cutting assembly for splitting a pill to form a split pill, said pill cutting assembly comprising:

a pill bottle; and a pill cutter attached to said pill bottle, said pill cutter comprising:

a pill cutter body extending along an axis between a first body end and a second body end spaced from said first body end along said axis, with said first body end of said pill cutter body presenting a first surface for holding the pill;

a lid coupled to said first body end of said pill cutter body, with said lid moveable between an open position and a closed position, and with said lid presenting a second surface facing said first surface when in said closed position;

a cutting instrument coupled to said second surf ace of said lid, with said cutting instrument configured to split the pill to form a split pill when said lid is moved from said open position toward said closed position;

a holding chamber member having a first end configured to be releasably coupled to the second body end of the pill cutter body, the holding chamber further having a second end configured to be releasably coupled to the pill bottle, the holding chamber member defining a storage chamber the split pill; and a cutter connector extending away from said second body end of said pill cutter body, with said cutter connector attached rotatably to either said pill bottle or said holding chamber member.

13. The pill cutting assembly as set forth in claim 12, wherein said cutter connector is chosen from one of a male threaded connector and a female threaded connector.

14. The pill cutting assembly as set forth in claim 13, wherein said pill bottle includes a bottle connector chosen from the other one of a male threaded connector and a female threaded connector, and wherein said cutter connector is configured to be engageable with the bottle connector of the pill bottle to attach said pill cutter to the pill bottle.

15. The pill cutting assembly as set forth in claim 14, wherein said bottle connector of said pill bottle is said female threaded connector, wherein said cutter connector is said male threaded connector, and wherein said male threaded connector of said pill cutter is engageable with said female threaded connector of said pill bottle to collectively define said holding chamber for holding the split pill.

16. The pill cutting assembly as set forth in claim 15, wherein said pill bottle has a pill bottle body and a pill bottle cap, wherein said pill bottle cap of said pill bottle includes said female threaded connector, and wherein said male threaded connector of said pill cutter is engageable with said female threaded connector of said pill bottle to collectively define said holding chamber for holding the split pill.

17. The pill cutting assembly as set forth in claim 16, wherein said male threaded connector of said pill cutter has a first diameter of about 25 to 50 millimeters.

18. The pill cutting assembly as set forth in claim 17, wherein said pill bottle cap and said cutter connector collectively define said holding chamber for holding the split pill, and said pill bottle cap and said pill bottle body collectively define a bottle interior separate from said holding chamber for holding the pill.

19. The pill cutting assembly as set forth in claim 18, wherein said male threaded connector of said pill cutter has a second diameter of about 20 to 40 millimeters.

20. The pill cutting assembly as set forth in claim 15, wherein said pill bottle has a pill bottle body, wherein said pill bottle body of said pill bottle includes said female threaded connector, and wherein said male threaded connector of said pill cutter is engageable with said female threaded connector of said pill bottle to collectively define the holding chamber for holding the split pill.

* * * * *